3,069,398
PROCESS FOR THE VULCANIZATION OF RUBBER
Helmut Freytag, Koln-Stammheim, Friedrich Lober, deceased, late of Leverkusen-Bayerwerk, by Lieselotte Lober, heiress, Leverkusen-Bayerwerk, and Hans Pohle, Leverkusen, Germany, assignors to Farbenfabriken Bayer Aktiengesellschaft, Leverkusen, Germany, a corporation of Germany
No Drawing. Filed June 3, 1960, Ser. No. 34,605
Claims priority, application Germany June 6, 1959
6 Claims. (Cl. 260—79.5)

In the procssing of mixtures of natural and/or synthetic rubber, which contain vulcanizing agents, accelerators, intensifier carbon blacks or other fillers, as well as anti-oxidants there is always a more or less strong tendency to scorching before the vulcanization proper.

Due to the recently greatly increased use of high-quality intensifying fillers, more especially modern carbon blacks by the furnace process, the acetylene carbon blacks or highly dispersed fillers with a base of silicic acid, silicates or oxides and carbonates of magnesium, aluminum or calcium, which cause an increased heat development when processing the rubber mixtures, and which increase the danger of scorching, partly due to their basic character, it has become an urgent problem to employ accelerators with a superior retarding action. An additional point is that operational production is today sometimes carried out at temperatures in the region of 130° C., these temperatures only being slightly below the actual vulcanization temperature.

It has now been found that benzthiazyl-2-(1'-methylol)-sulfenamides of the general formula

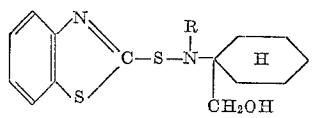

in which R represents a hydrogen atom or a straight or branched chain lower alkyl radical containing from 1 to 6 carbon atoms, show surprising advantages when used industrially as vulcanization accelerators.

Compounds used according to the invention are for example:

| | M.P., °C. | Analysis | |
|---|---|---|---|
| | | Calc., N, Percent | Found, N, Percent |
| benzthiazyl-2-(1'-methylol)-cyclohexyl sulfenamide (R=H) | 133–135 | 9.51 | 9.35 |
| benzthiazyl-2-(1'-methylol)-N-n-butyl cyclohexyl sulfenamide (R=C₄H₉) | 137–139 | 8.80 | 9.14 |

The advantages of the new sulfenamides according to the invention over the previously known compounds consist in a very appreciable delay in initiation of the vulcanization and a consequently substantially higher processing reliability. They thus conform to the standards of the recent processing techniques as initially described. These advantages of the new type of accelerator are found both in mixtures of the "pure gum type" and in mixtures containing fillers, more especially in combination with quick-heating furnace and acetylene carbon blacks as well as with light-colored highly dispersed fillers which cause high heat development when used industrially and for example present known processing difficulties in the extrusion process. The new accelerators moreover render possible the use of high-grade anti-oxidants and anti-oxidants in an increased quantity, the basic character of which enable them to activate strongly the initiation of vulcanization and endanger the reliable processing. In certain cases, the accelerators according to the invention can be employed in higher quantities than known vulcanization accelerators while retaining the same reliability in processing. The new sulfenamide accelerators containing methylol groups can either be used alone or in combination with one another, and they can also be combined with known vulcanization accelerators.

As sole accelerators, they can be used in the quantity usual for sulfenamides, for example in an amount of from 0.15 to 1.5% with natural rubber and in an amount of from 0.2 to 4% with synthetic rubber. For special purposes, these quantities can also be exceeded, for example in order further to improve the fatigue and ageing properties of the vulcanizates.

The sulfenamides according to the invention can be prepared by processes known per se, for example by reacting benzthiazole-2-sulfene chloride with 1-amino-1-methylol-cyclo-hexane in an inert solvent such as benzene and in the presence of an acid acceptor, such as for example triethyl-amine. They are stable crystalline products with a weak characteristic odor. They are soluble in aromatic hydrocarbons and consequently can be satisfactorily and quickly dispersed in the rubber.

The accelerators employed in the process according to the invention can be used in both natural rubber and synthetic, rubber-like polymers, such as those which are for exampl obtained from conjugated diolefins or copolymers of conjugated diolefins with polymerizable vinyl compounds such as styrene, acrylonitrile or esters of acrylic and methacrylic acid and similar compounds. In the following examples, the technical properties of these new accelerators are inter alia also shown in comparison with known accelerators.

The following examples further illustrate the invention without limiting it thereto.

EXAMPLE 1

The properties of the following accelerators were tested:
(a) Dibenzthiazyl disulfide (for comparison purposes).
(b) Benzthiazyl-2-cyclohexyl-sulfenamide (for comparison purposes).
(c) Benzthiazyl-2-(1'-methylol)-cyclohexyl sulfenamide.
(d) Benzthiazyl-2-(1'-methylol)-N-n-butyl cyclohexyl sulfenamide.

A test mixture, containing 45.0 parts by weight of highly abrasion-resistant furnace black ("HAF-carbon black)
5.0 parts by weight of zinc oxide
3.6 parts by weight of mineral oil plasticizer
3.6 parts by weight of zinc soap from synthetic fatty acid
1.0 part by weight of mixture of age resistors phenyl-α-naphthylamine and N-phenyl-N'-cyclohexyl-p-phenylenediamine (1:1)
2.3 parts by weight of sulfur to 100.0 parts by weight of natural rubber, is divided into 4 equal parts and each part has added thereto one of the following additives, related to the rubber content:
(A) 0.45% by weight of dibenzthiazyl disulfide.
(B) 0.45% by weight of benzthiazyl-2-cyclohexyl-sulfenamide.
(C) 0.45% by weight of benzthiazyl-2-(1'-methylol)-cyclohexyl-sulfenamide.

(D) 0.45% by weight of benzthiazyl-2-(1'-methylol)-N-n-butyl-cyclohexyl-sulfenamide.

The unvulcanized mixtures show the following scorching times in the Mooney apparatus (M. Melvin Mooney, Ind. Eng. Chem., Analyt. Ed. 6 (1934), page 147 et seq.):

Table 1

| Mixture: | Mooney value at 121° C. (in minutes) |
|---|---|
| A | 15 |
| B | 19 |
| C | 23 |
| D | 22 |

After suitable vulcanization in a press, the following comparison values are obtained according to the Schopper ring test (the first number in each case represents the modulus value at 300% elongation and the second number gives the breaking strength (kg./cm.²/breaking elongation (percent)).

Table 2

Scorching and curing in a press

| | 110° C.; 30 minutes | 143° C.; 25 minutes |
|---|---|---|
| A | 36—110/550 | 117—250/530 |
| B | 29—95/560 | 120—250/520 |
| C | 19—60/570 | 117—245/545 |
| D | 21—65/580 | 117—260/560 |

It is shown from the two comparison tables that the new compounds (C and D) provide increased safeguard against scorching.

Similar results are obtained by using instead of natural rubber synthetic rubber, such as butadiene-styrene copolymers, or butadiene-acrylonitrile copolymers.

The benzthiazyl-2-(1'-methylol)-cyclohexyl-sulfenamide may be prepared in the following manner:

A solution of 0.38 mol of benzthiazol sulfene chloride in 450 cc. of benzene is added dropwise at 30–35° C. to a solution of 50 g. of 1-amino-1-methylol-cyclohexane (0.38 mol) and 41 g. of triethylamine in 150 cc. of benzene. After completing the dropwise addition, the mixture is stirred for another 1½ hours at room temperature, cooled, suction-filtered and the residue is freed from the solvent. It is washed with water until free from salt, dried and thereafter dissolved and allowed to crystallize from benzene/petroleum ether. The beige-colored benzthiazyl-2-(1'-methylol)-cyclohexyl sulfenamide melts at 133–135° C.

We claim:

1. As novel compounds compounds of the formula

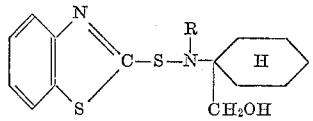

in which R represents a member selected from the group consisting of a straight and branched chain alkyl radical containing from 1 to 6 carbon atoms, and hydrogen.

2. As novel compound

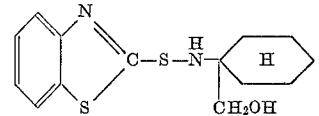

3. As novel compound

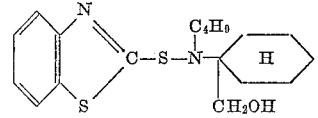

4. In the process for the vulcanization of natural rubber and vulcanizable elastomeric homopolymers and copolymers of conjugated dienes the improvement which comprises using as vulcanization accelerators compounds of the general formula

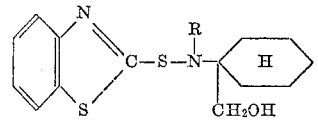

in which R represents a member selected from the group consisting of a straight and branched chain alkyl radical containing from 1 to 6 carbon atoms, and hydrogen.

5. In the process for the vulcanization of natural rubber and vulcanizable elastomeric homopolymers and copolymers of conjugated dienes the improvement which comprises using as vulcanization accelerators a compound of the formula

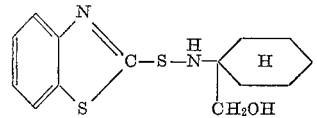

6. In the process for the vulcanization of natural rubber and vulcanizable elastomeric homopolymers and copolymers of conjugated dienes the improvement which comprises using as vulcanization accelerators a compound of the formula

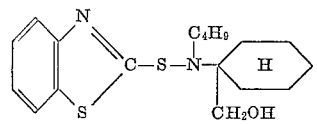

References Cited in the file of this patent

UNITED STATES PATENTS

| 1,996,011 | Messer | Mar. 26, 1935 |
| 2,460,393 | Paul | Feb. 1, 1949 |
| 2,495,085 | Alliger | Jan. 17, 1950 |
| 2,700,659 | Carr | Jan. 25, 1955 |
| 2,762,814 | Lunt | Sept. 11, 1956 |
| 2,891,960 | Ruschig et al. | June 23, 1959 |